United States Patent
Shin et al.

(10) Patent No.: US 9,535,451 B2
(45) Date of Patent: Jan. 3, 2017

(54) EMBEDDED MULTIMEDIA CARD USING UNIDIRECTIONAL DATA STROBE SIGNAL, HOST FOR CONTROLLING THE SAME, AND RELATED METHODS OF OPERATION

(71) Applicant: SAMSUNG ELECTRONICS CO., LTD., Suwon-Si, Gyeonggi-Do (KE)

(72) Inventors: Myung Sub Shin, Suwon-Si (KR); Sung Ho Seo, Seoul (KR); Kyung Phil Yoo, Seoul (KR); Jung Pil Lee, Hwaseong-Si (KR); Hwa Seok Oh, Yongin-Si (KR); Young Gyu Kang, Yongin-Si (KR); Jun Ho Choi, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 451 days.

(21) Appl. No.: 14/024,655

(22) Filed: Sep. 12, 2013

(65) Prior Publication Data
US 2014/0082397 A1    Mar. 20, 2014

(30) Foreign Application Priority Data
Sep. 14, 2012    (KR) .................. 10-2012-0102490

(51) Int. Cl.
*G06F 1/12*    (2006.01)
*G06F 1/10*    (2006.01)

(52) U.S. Cl.
CPC .. *G06F 1/12* (2013.01); *G06F 1/10* (2013.01)

(58) Field of Classification Search
CPC .............. G11C 7/10; G11C 7/222; G06F 1/10; G06F 1/14; G06F 13/00; G06F 1/12; G06F 13/1689; G06F 13/42
See application file for complete search history.

(56) References Cited

U.S. PATENT DOCUMENTS

| | | | |
|---|---|---|---|
| 6,600,681 B1* | 7/2003 | Korger | G11C 7/1066 365/193 |
| 7,590,011 B2* | 9/2009 | Park | G11C 7/1069 365/189.08 |
| 7,636,262 B2 | 12/2009 | Kim et al. | |
| 7,721,161 B2 | 5/2010 | Liu | |
| 7,836,378 B2 | 11/2010 | Shaeffer et al. | |
| 7,937,643 B1 | 5/2011 | Chang et al. | |
| 7,984,321 B2* | 7/2011 | Shibata | G06F 1/3203 455/39 |
| 8,042,023 B2 | 10/2011 | Balb | |
| 8,132,074 B2 | 3/2012 | Bains et al. | |

(Continued)

FOREIGN PATENT DOCUMENTS

| | | |
|---|---|---|
| JP | 2007072922 | 3/2007 |
| JP | 2007219875 | 8/2007 |
| KR | 20110111217 A | 10/2011 |

*Primary Examiner* — Fahmida Rahman
(74) *Attorney, Agent, or Firm* — Volentine & Whitt, PLLC

(57) ABSTRACT

An embedded multimedia card (eMMC) comprises a clock channel configured to receive a clock signal from a host, a command channel configured to receive a command from the host, a plurality of data channels configured to transmit data to the host, a data strobe channel configured to transmit a data strobe signal synchronized with the data to the host, and a data strobe control unit configured to selectively enable or generate the data strobe signal according to a protocol control signal.

16 Claims, 14 Drawing Sheets

(56) References Cited

U.S. PATENT DOCUMENTS

| | | | |
|---|---|---|---|
| 8,520,455 B2* | 8/2013 | Ross | G11C 8/18 |
| | | | 365/185.18 |
| 2002/0126564 A1* | 9/2002 | Yoo | G11C 7/22 |
| | | | 365/233.1 |
| 2005/0097291 A1 | 5/2005 | Han | |
| 2008/0031079 A1* | 2/2008 | Osawa | G11C 7/1066 |
| | | | 365/233.1 |
| 2008/0132091 A1* | 6/2008 | Choi | G06K 19/07 |
| | | | 439/55 |
| 2008/0162479 A1 | 7/2008 | Ju | |
| 2009/0222713 A1 | 9/2009 | Shin et al. | |
| 2009/0313533 A1 | 12/2009 | Bains | |
| 2011/0264851 A1* | 10/2011 | Jeon | G06F 13/1689 |
| | | | 711/103 |

\* cited by examiner

FIG. 7

| Bit | Device Type |
|---|---|
| 7 | HS400 Dual Data Rate e·MMC @ 200 MHz − 1.2V I/O |
| 6 | HS400 Dual Data Rate e·MMC @ 200 MHz − 1.8V I/O |
| 5 | HS200 Single Data Rate e·MMC @ 200 MHz − 1.2V I/O |
| 4 | HS200 Single Data Rate e·MMC @ 200 MHz − 1.8V I/O |
| 3 | High-Speed Dual Data Rate e·MMC @ 52 MHz − 1.2V I/O |
| 2 | High-Speed Dual Data Rate e·MMC @ 52 MHz − 1.8V or 3V I/O |
| 1 | High-Speed e·MMC @ 52 MHz − at rated device voltage(s) |
| 0 | High-Speed e·MMC @ 26 MHz − at rated device voltage(s) |

US 9,535,451 B2

EMBEDDED MULTIMEDIA CARD USING UNIDIRECTIONAL DATA STROBE SIGNAL, HOST FOR CONTROLLING THE SAME, AND RELATED METHODS OF OPERATION

CROSS-REFERENCE TO RELATED APPLICATIONS

This application claims priority under 35 U.S.C. §119(a) to Korean Patent Application No. 10-2012-0102490 filed on Sep. 14, 2012, the subject matter of which is hereby incorporated by reference.

BACKGROUND OF THE INVENTION

Embodiments of the inventive concept relate generally to embedded multimedia cards (eMMC), and eMMC systems comprising a host and an eMMC. More particularly, certain embodiments of the inventive concept relate to eMMCs using a unidirectional data strobe signal.

The so-called multimedia card (MMC) is a flash memory card standard. The eMMC is an embedded MMC standard defined by the Joint Electronic Devices Engineering Council (JEDEC). In general configuration and application, eMMCs are designed to be inserted (or "embedded") in conjunction with a host within mobile communication devices such as smart phones. Conventionally, the eMMC communicates data signals, control signals, commands, clock(s) and/or power signals with the connected host in accordance with a standardize ten (10) signal line bus. Those skilled in the art will understand that various JEDEC standards are available that characterize and/or define the structure, constitution and/or operating parameters of certain eMMCs. These standards may be readily obtained and consulted by recourse to http://www.jedec.org. For example, the eMMC electrical standard, version 4.51 published June 2012 (i.e., JESD84-B451) contains many terms and technical definitions that are useful to an understanding of the inventive concept described hereafter.

In general, there is a need to improve the performance (e.g., speed and reliability) of data transfer and other operations in systems comprising a host and an eMMC.

SUMMARY OF THE INVENTION

In one embodiment of the inventive concept, an eMMC comprises a clock channel configured to receive a clock signal from a host, a command channel configured to receive a command from the host, a plurality of data channels configured to transmit data to the host, a data strobe channel configured to transmit a data strobe signal synchronized with the data to the host, and a data strobe control unit configured to selectively enable or generate the data strobe signal according to a protocol control signal.

In another embodiment of the inventive concept, a method is provided for operating an eMMC system comprises an eMMC and a host. The method comprises the eMMC receiving a clock signal from the host through a clock channel, the eMMC receiving a command through a command channel and decoding the command, transmitting data corresponding to the command to the host through data channels, generating a data strobe signal synchronized with the data using the clock signal, and selectively enabling and transmitting the data strobe signal to the host through a data strobe channel according to a protocol control signal.

These and other embodiments can potentially improve the speed and reliability of data transfers between a host and an eMMC.

BRIEF DESCRIPTION OF THE DRAWINGS

The drawings illustrate selected embodiments of the inventive concept. In the drawings, like reference numbers indicate like features.

FIG. 7 is a table showing possible bit definitions for a device type field of an eMMC, according to an embodiment of the inventive concept.

DETAILED DESCRIPTION

Figure 1:
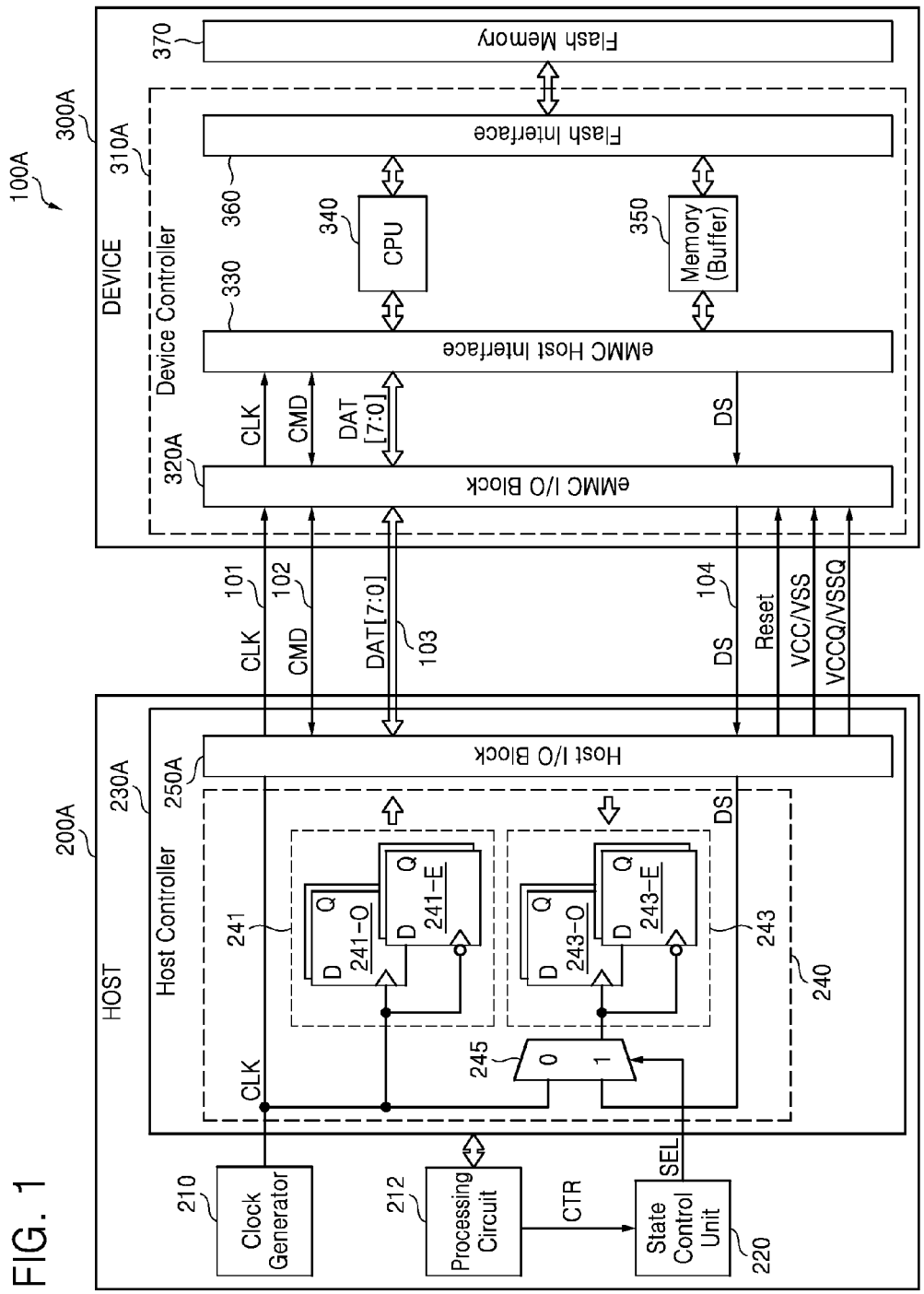
FIG. 1 is a block diagram of an eMMC system, according to an embodiment of the inventive concept.

Embodiments of the inventive concept are described below with reference to the accompanying drawings. These embodiments are presented as teaching examples and should not be construed to limit the scope of the inventive concept.

In the description that follows, where a feature is referred to as being "connected" to another feature, it can be directly connected to the other feature or intervening features may be present. In contrast, where a feature is referred to as being "directly connected" to another feature, there are no intervening features present. As used herein, the term "and/or"

includes any and all combinations of one or more of the associated listed items and may be abbreviated as "/".

The terms first, second, etc. may be used herein to describe various features, but the described features should not be limited by these terms. Rather, these terms are used merely to distinguish between different features. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. Terms such as "comprises" and/or "comprising," or "includes" and/or "including", where used herein, indicate the presence of stated features but do not preclude the presence or addition of one or more other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or this application, and will not be interpreted in an idealized or overly formal sense unless expressly so defined herein.

The term "channel" denotes a signal path enabling the transmission of one or more electrical signal(s) (e.g., a voltage). A channel may include, for instance, one or more circuits acting upon the one or more electrical signal(s), a host pad (and/or pin), an eMMC pad (and/or pin), a line (or collection of lines), a driver (e.g., certain differential amplifiers), and a receiver (e.g., certain differential amplifiers).

Various embodiments of the inventive concept comprise at least one "additional" signal line or signal wire (hereafter, simply "line") having a specific purpose. This additional line will be additive to standard 10-wire configuration(s) specified by JEDEC standards. The provision of an additional line within certain embodiments of the inventive concept increases noise immunity and improves transmission speed for data communicated between a host and a device during a read operation while operating in a double data rate (DDR) mode. In this regard, pending U.S. patent application Ser. No. 14/025,879 filed on Sep. 13, 2013 and claiming priority to Korean Patent Application No. 10-2012-0102467 filed on Sep. 14, 2012 is hereby incorporated by reference.

Figure 2:
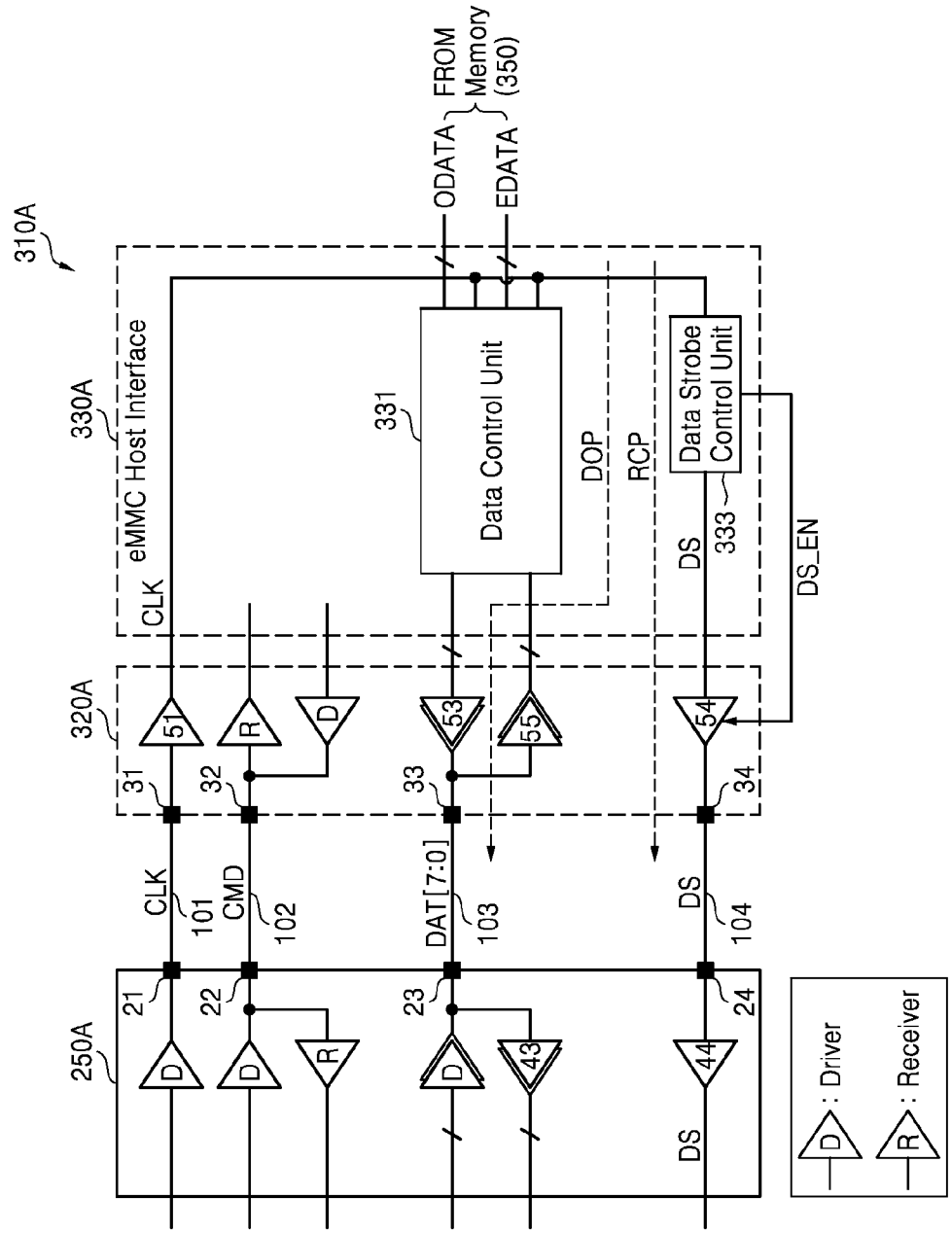
FIG. 2 is a block diagram of a portion of the eMMC system of FIG. 1, according to an embodiment of the inventive concept.

For the sake of convenience, this description may avoid a discussion of propagation delays of certain circuit elements such as buses, wires, pads, pins, drivers, receivers, differential amplifiers, etc. Nevertheless, those skilled in the art will appreciate various effects that may be presented by such delays in practical implementations. Also, unless expressly indicated otherwise, input and output signals of particular functional circuits may be denoted by the same name. For instance, as shown in FIG. 2, both of the input signal and the output signal of each of functional circuits 54 and 44 are labeled DS.

Figure 3:
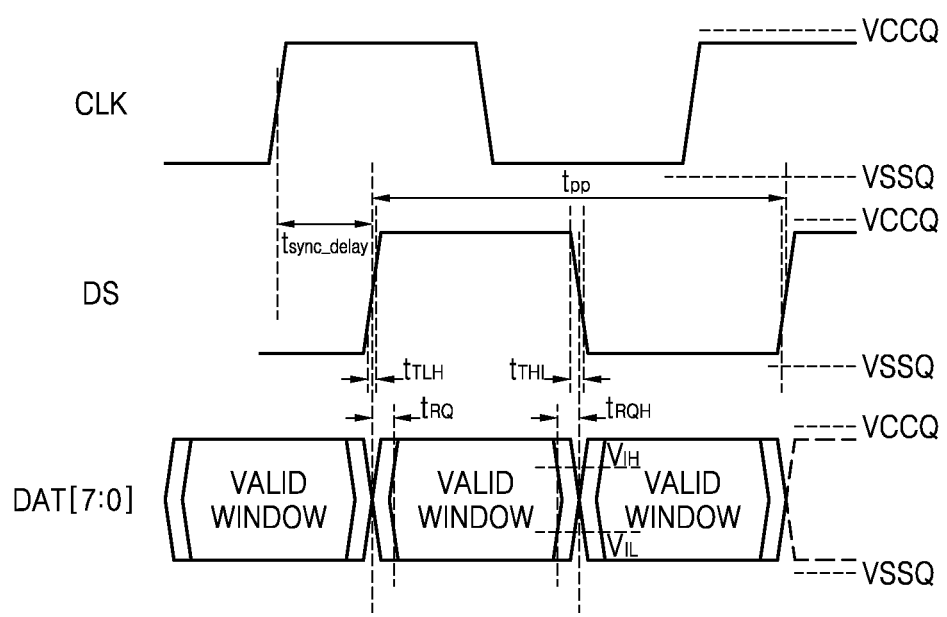
FIG. 3 is a timing diagram for various signals of the eMMC system of FIG. 1, according to an embodiment of the inventive concept.

As indicated by the following description, an eMMC according to an embodiment of the inventive concept transmits a data strobe signal generated based on a clock signal to a host through a data strobe bus during a read operation in a HS (high speed) 400 mode. As shown in FIG. 3, for example, an edge of the data strobe signal transmitted to the host is synchronized with an edge of data. The host can safely process, for example, data output from the eMMC by using the data strobe signal as a strobe signal. During the read operation in the HS400 mode, the host and the device may use differential signaling to eliminate or reduce the influence of noise occurring due to the clock signal. The host and the device may also use differential signaling to eliminate or reduce noise occurring due to the data strobe signal. Here, the HS400 mode is an operation mode in which data can be processed at 200 MHz DDR (double data rate) when an input/output (I/O) operating voltage VCCQ of a host or a device is 1.2 or 1.8 V. That is, the HS400 mode may be an operation mode having high speed data rate.

FIG. 1 is a block diagram of an eMMC system 100A according to an embodiment of the inventive concept.

Referring to FIG. 1, eMMC system 100A comprises a host 200A and an eMMC 300A. Host 200A controls data processing operations such as a read operation and a write operation. The data processing operations may be performed at a single data rate (SDR) or a doubledata rate (DDR). Host 200A typically comprises a data processing device, such as a central processing unit (CPU), a processor, a microprocessor, or an application processor, which can process data. The data processing device may be embedded or implemented in an electronic device, such as e.g., a personal computer (PC), a laptop computer, a mobile telephone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book.

The eMMC 300A can be electrically connected with host 200A through any of various connection structures, e.g., pads, pins, buses, or communication lines.

Host 200A comprises a clock generator 210, a processing circuit 212, a state control unit 220, and a host controller 230A. Clock generator 210 generates a clock signal CLK used in host 200A and eMMC 300A. Clock generator 210 can be implemented as a phase locked loop (PLL).

Processing circuit 212 can be implemented in hardware or hardware equipped with the software (or firmware) that generates command CMD, analyzes response RES, processes data stored in an extended card specific data (CSD) register (or an EXT_CSD register) 371, and/or controls the processing of I/O data. Processing circuit 212 controls operations of components 210, 220, and 230A.

State control unit 220 generates a first selection signal SEL in response to state control signal CTR. In some embodiments, state control unit 220 generates first selection signal SEL according to an operation mode of device 300A and a type of processing data. For example, state control unit 220 may generate first selection signal SEL for a selection circuit 245 to select data strobe signal DS when the operation mode of device 300A is the HS400 mode and the type of processing data is read data or CRC status response data.

Host controller 230A comprises a data I/O circuit 240 and a host I/O block 250A. During a write operation, data I/O circuit 240 transmits write data to be written to flash memory 370 of eMMC 300A to host I/O block 250A in response to clock signal CLK.

During a read operation, data I/O circuit 240 receives read data from flash memory 370 through host I/O block 250A in response to an output signal CLK or DS of selection circuit 245. Data I/O circuit 240 comprises a write latch circuit 241 and a read latch circuit 243. Write latch circuit 241 comprises first write latches 241-O and second write latches 241-E. First write latches 241-O latch odd-numbered data in write data to be written to eMMC 300A in response to a rising edge of clock signal CLK. Second write latches 241-E latch even-numbered data in the write data in response to a falling edge of clock signal CLK.

Read latch circuit 243 comprises first read latches 243-O and second read latches 243-E. First read latches 243-O latch odd-numbered data in read data output from eMMC 300A in response to a rising edge of the output signal CLK or DS of selection circuit 245. Second read latches 243-E latch even-numbered data in the read data in response to a falling edge of the output signal CLK or DS of selection circuit 245.

Selection circuit 245 comprises a multiplexer. The multiplexer transmits clock signal CLK to read latch circuit 243 in response to selection signal SEL at a first level, e.g., a low level, and it transmits data strobe signal DS to read latch circuit 243 in response to selection signal SEL at a second level, e.g., a high level.

Figure 10:
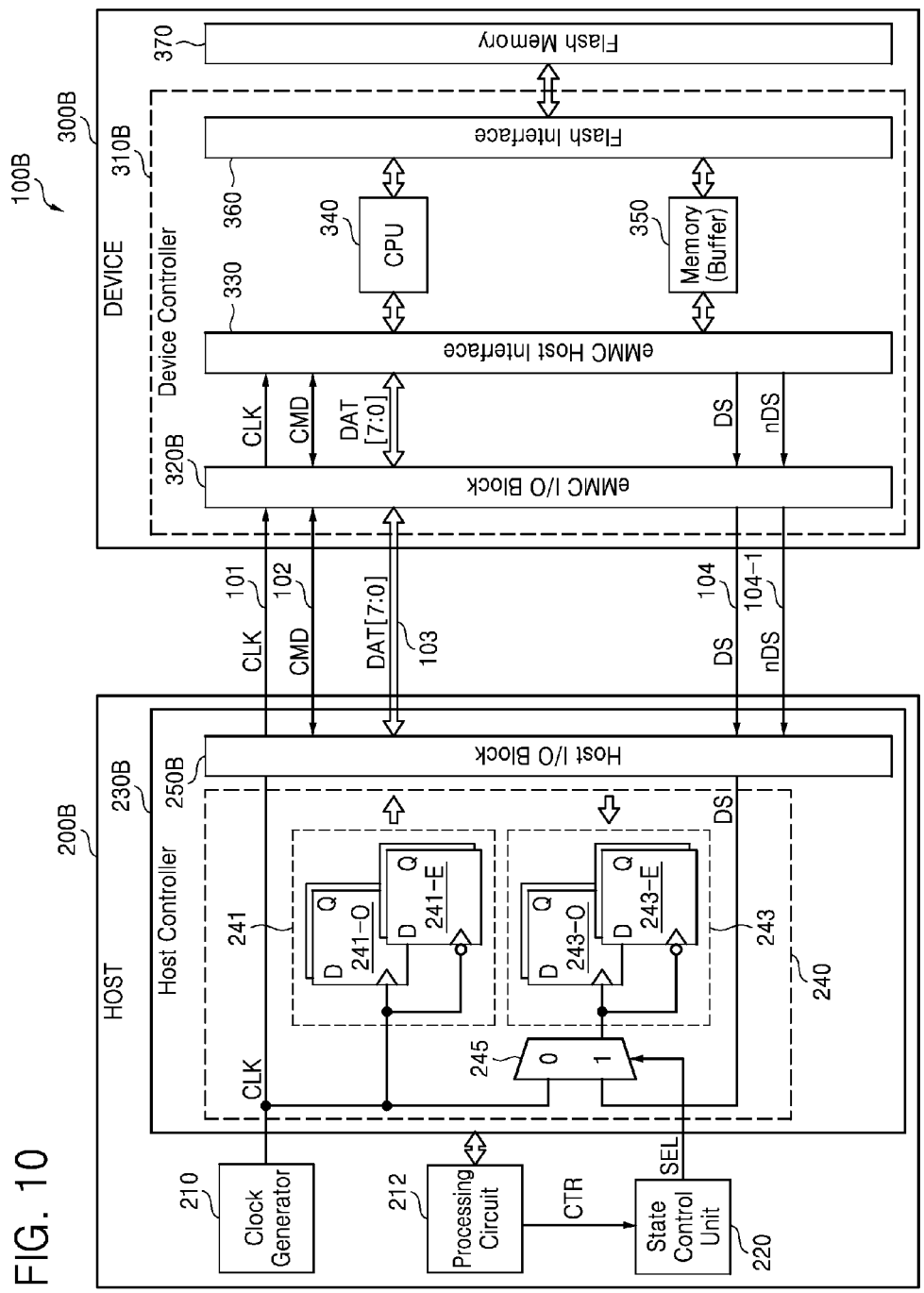
FIG. 10 is a block diagram of an eMMC system, according to an embodiment of the inventive concept.

Although hosts 200A and 200B respectively illustrated in FIGS. 1 and 10 include state control unit 220 and selection circuit 245, these features may be omitted in certain alternative embodiments. In such embodiments, data strobe signal DS may be directly input to read latch circuit 243 during the read operation in the HS400 mode, so that first read latches 243-O latch odd-numbered data in the read data output from eMMC 300A in response to a rising edge of data strobe signal DS and second read latches 243-E latch even-numbered data in the read data in response to a falling edge of data strobe signal DS.

An eMMC bus illustrated in FIG. 1 comprises eleven buses (or communication lines) 101, 102, 103, and 104. The eleven buses 101, 102, 103, and 104 comprise a unidirectional clock bus 101, a bidirectional command bus 102, bidirectional data bus 103 and a unidirectional data strobe bus 104. Clock bus 101 transmits clock signal CLK. Bidirectional command bus 102 transmits command CMD to eMMC 300A and transmits response RES to command CMD to host 200A.

Bidirectional data bus 103 transmits write data DAT[7:0] to eMMC 300A for the write operation and transmits read data DAT[7:0] to host 200A for the read operation. Unidirectional data strobe bus 104 transmits data strobe signal DS to host 200A. The eMMC system 100A uses data strobe signal DS to increase the transmission speed of read operations and throughput of total data in the HS400 mode.

Host 200A transmits a hardware reset signal RST_n to eMMC 300A through a reset line. Host 200A generates I/O operating voltages VCCQ and VSSQ used in I/O blocks 250A and 320A and transmits I/O operating voltages VCCQ and VSSQ to eMMC 300A through power lines. A driver (e.g., a differential amplifier) and a receiver (e.g., a differential amplifier) of I/O blocks 250A and 320A may use I/O operating voltages VCCQ and VSSQ as operating voltages.

The eMMC system 100A further comprises a voltage reference line 105 transmitting a voltage reference VREF, which is generated using I/O operating voltages VCCQ and VSSQ, to eMMC 300A. Host 200A also generates core operating voltages VCC and VSS for flash memory 370 and transmits core operating voltages VCC and VSS to eMMC 300A through core power lines. Voltages VSSQ and VSS are ground voltages.

In each of eMMC systems 100A and 100B, the reset signal, I/O operating voltages VCCQ and VSSQ, and core operating voltages VCC and VSS are provided from host 200A or 200B to eMMC 300A or 300B. However, only some of the reset signal and voltages VCCQ, VSSQ, VCC, and VSS may be illustrated in various figures. The structures and operations of host I/O block 250A and eMMC I/O block 320A are described in further detail with reference to FIG. 2.

The eMMC 300A comprises a device controller, e.g., an eMMC controller, 310A and flash memory 370. The eMMC controller 310A controls communication between host 200A and flash memory 370. The eMMC controller 310A comprises eMMC I/O block 320A, an eMMC host interface 330, a CPU 340, a memory 350, and a flash interface 360.

In the HS400 mode, eMMC host interface 330 receives clock signal CLK and command CMD through eMMC I/O block 320A. It generates data strobe signal DS based on clock signal CLK, transmits data strobe signal DS to eMMC I/O block 320A, interprets command CMD, generates a response according to a result of the interpretation, and transmits the response to eMMC I/O block 320A. In addition, eMMC host interface 330 transmits data stored in an EXT_CSD register of flash memory 370 to eMMC I/O block 320A according to command CMD (e.g., SEND_EXT_CSD (CMD8)) output from host 200A in the HS400 mode.

During the write operation, eMMC host interface 330 temporarily stores data DAT[7:0] received through eMMC I/O block 320A in memory 350 (e.g., buffer) using clock signal CLK under control of CPU 340. At this time, flash interface 360 reads data DAT[7:0] from memory 350 and writes data DAT[7:0] to flash memory 370 under control of CPU 340.

During the read operation, flash interface 360 stores data output from flash memory 370 in memory 350 under control of CPU 340. At this time, eMMC host interface 330 reads data DAT[7:0] from memory 350 and transmits data DAT[7:0] to eMMC I/O block 320A using clock signal CLK under control of CPU 340.

CPU 340 controls operations of interfaces 330 and 360 and controls overall operation of eMMC 300A. Memory 350 temporarily stores data transferred between interfaces 330 and 360. Memory 350 typically comprises a volatile memory. Where flash memory 370 is implemented by NAND flash memory, flash interface 360 may be implemented by a NAND flash interface.

FIG. 2 is a diagram of a part of eMMC system 100A illustrated in FIG. 1, which includes a data strobe control unit 333, according to an embodiment of the inventive concept. FIG. 3 is a waveform timing diagram of clock signal CLK, data strobe signal DS, and data DAT[7:0] according to an embodiment of the inventive concept.

Referring to FIGS. 1 and 2, host I/O block 250A comprises drivers D, receivers 43 and 44, and host pads 21 through 24. The eMMC I/O block 320A comprises eMMC pads 31 through 34, receivers 51 and 55, and drivers 53 and 54.

An eMMC host interface 330A, which is an example of eMMC host interface 330 illustrated in FIG. 1, comprises a data control unit 331 and data strobe control unit 333. Data control unit 331 receives write data from host 200A in a write operation and transmits read data from memory 350 to host 200A in a read operation. The structure and the operation of data control unit 331 are described in further detail with reference to FIG. 5.

Data strobe control unit 333 generates data strobe signal DS based on clock signal CLK output from receiver 51 in a particular mode (e.g., HS400 mode). Data strobe control unit 333 is configured similar to a data output circuit of data control unit 331.

Where the delay or latency of a data output path DOP comprising data control unit 331 is designed or adjusted to be the same as that of a data strobe output path RCP comprising data strobe control unit 333, as shown in FIG. 3, data strobe control unit 333 transmits data strobe signal DS synchronized with data DAT[7:0] to host I/O block 250A through features 54, 34, and 104. Alternatively, data strobe control unit 333 may include delay logic. The delay of the delay logic may be adjusted or programmed.

Receiver 44 transmits data strobe signal DS to read latch circuit 243 directly or through selection circuit 245. During the read operation in the HS400 mode, data strobe signal DS may be used as a strobe signal for a high-speed read operation. As shown in FIG. 3, the edges of data strobe signal DS are synchronized with the edges of parallel data DAT[7:0]. Parallel data DAT[7:0] may be transmitted at 200 Mhz DDR.

As described above, from the viewpoint of eMMC pads 33 and 34, data strobe control unit 333 generates data strobe signal DS synchronized with parallel data DAT[7:0]. In other words, as shown in FIG. 3, data strobe signal DS may be generated to be edge-aligned with parallel data DAT[7:0]. Accordingly, eMMC 300A reduces skew between parallel data DAT[7:0] and data strobe signal DS to achieve a data valid window.

In FIG. 3, $t_{sync\_delay}$ denotes a time difference (or delay) between clock signal CLK and data strobe signal DS or a time difference between clock signal CLK and parallel data DAT[7:0]. In FIG. 3, $t_{PP}$ or $t_{PERIOD}$ denotes a period of data strobe signal DS. At this time, $t_{RQ}$ and $t_{RQH}$ denote AC timing parameters for data DAT[7:0] output to host 200A. They define skew between parallel data DAT[7:0] and data strobe signal DS. In other words, $t_{RQ}$ denotes an output hold skew and $t_{RQH}$ denotes an output hold time.

The output hold skew $t_{RQ}$ is a restriction that holds data until an edge of data strobe signal DS occurs and the output hold time $t_{RQH}$ is a restriction on time taken to make the data normal because the edge of data strobe signal DS occurs. $V_{IH}$ denotes an input high voltage and $V_{IL}$ denotes an input low voltage.

Figure 4:
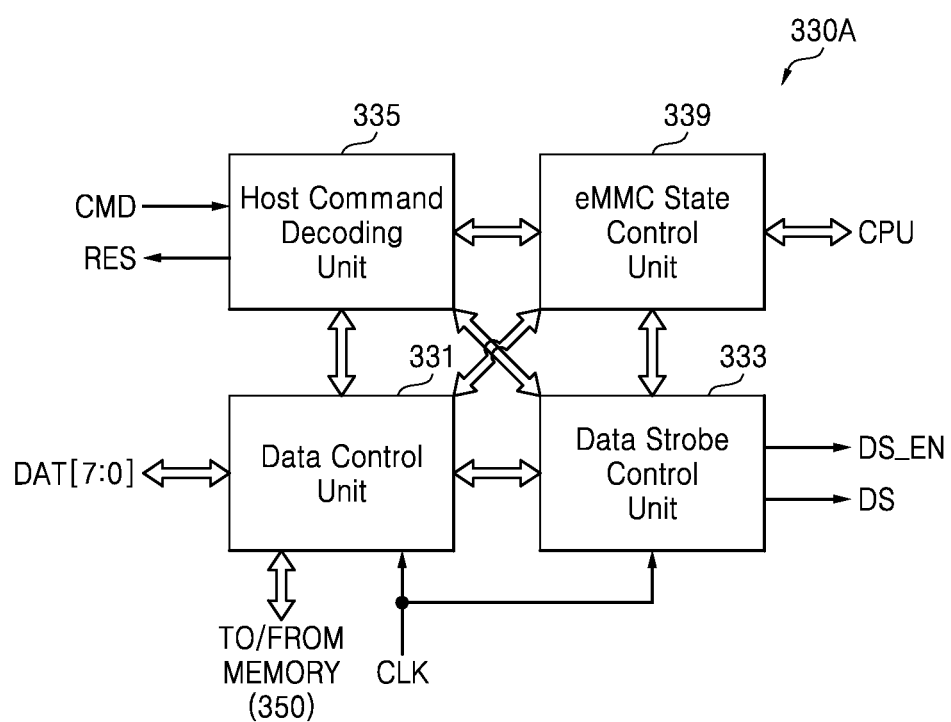
FIG. 4 is a block diagram of an eMMC host interface, according to an embodiment of the inventive concept.

FIG. 4 is a block diagram illustrating the structure of eMMC host interface 330A according to an embodiment of the inventive concept.

Referring to FIG. 4, eMMC host interface 330A comprises data control unit 331, data strobe control unit 333, a host command decoding unit 335, and an eMMC state control unit 339.

Host command decoding unit 335 receives command CMD from host 200'A through command bus 102, eMMC pad 32, and receiver R connected to eMMC pad 32. It decodes command CMD, generates a response RES according to the result of the decoding, and transmits response RES to host 200A.

Where command CMD is SEND_EXT_CSD (CMD8), data control unit 331 transmits EXT_CSD register values from memory 350 to host 200A.

Host command decoding unit 335 transmits the result of decoding command CMD to data control unit 331, data strobe control unit 333, and/or eMMC state control unit 339. Host command decoding unit 335 may also transmit control signal generated based on response RES to data control unit 331, data strobe control unit 333, and/or eMMC state control unit 339.

The eMMC state control unit 339 controls the state of eMMC 300A based on control operations of CPU 340, communication with host command decoding unit 335, and/or communication with data control unit 331. In addition, eMMC state control unit 339 may provide data strobe control unit 333 with state information.

Data control unit 331 controls data transactions and transmits/receives data based on control operations of CPU 340, communication with host command decoding unit 335, and/or communication with eMMC state control unit 339. In addition, data control unit 331 may provide data strobe control unit 333 with information about current data under control, such as information indicating that current output data is CRC data.

Figure 5:
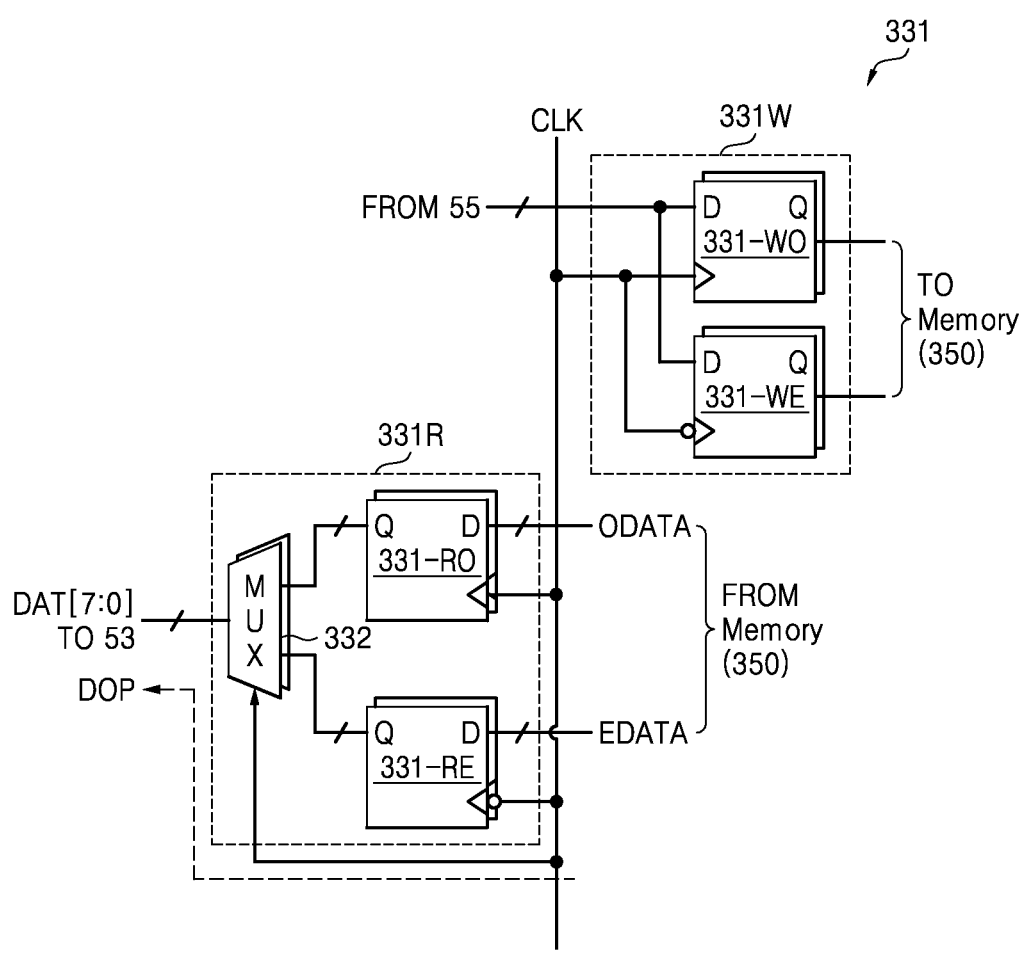
FIG. 5 is a block diagram of a part of a data control unit illustrated in FIG. 2, according to an embodiment of the inventive concept.

FIG. 5 is a block diagram illustrating the structure of a part of data control unit 331 illustrated in FIG. 2, according to an embodiment of the inventive concept.

Referring to FIGS. 2 and 5, data control unit 331 comprises a read latch circuit 331R and a write latch circuit 331W. During the read operation, read latch circuit 331R is enabled under control of host command decoding unit 335 or eMMC state control unit 339. During the write operation, write latch circuit 331W is enabled under control of host command decoding unit 335 or eMMC state control unit 339.

Read latch circuit 331R comprises first data output latches 331-RO and second data output latches 331-RE. During the read operation, first data output latches 331-RO latch odd-numbered data ODATA among data output from memory 350 in response to a rising edge of clock signal CLK. During the read operation, second data output latches 331-RE latch even-numbered data EDATA among the data output from memory 350 in response to a falling edge of clock signal CLK.

A selection circuit 332 outputs odd-numbered data ODATA latched by first data output latches 331-RO to drivers 53 in response to a rising edge of clock signal CLK, and it outputs even-numbered data EDATA latched by second data output latches 331-RE to drivers 53 in response to a falling edge of clock signal CLK. Selection circuit 332 can be implemented by a multiplexer, for example.

Drivers 53 output odd-numbered data ODATA and even-numbered data EDATA, which are sequentially output from selection circuit 332, to host pads 33. Write latch circuit 331W comprises first data input latches 331-WO and second data input latches 331-WE. During the write operation, first data input latches 331-WO transmit odd-numbered data ODATA among data output from receivers 55 to memory 350 in response to a rising edge of clock signal CLK. During the write operation, second data input latches 331-WE transmit even-numbered data EDATA among the data output from receivers 55 to memory 350 in response to a falling edge of clock signal CLK.

Figure 6A:
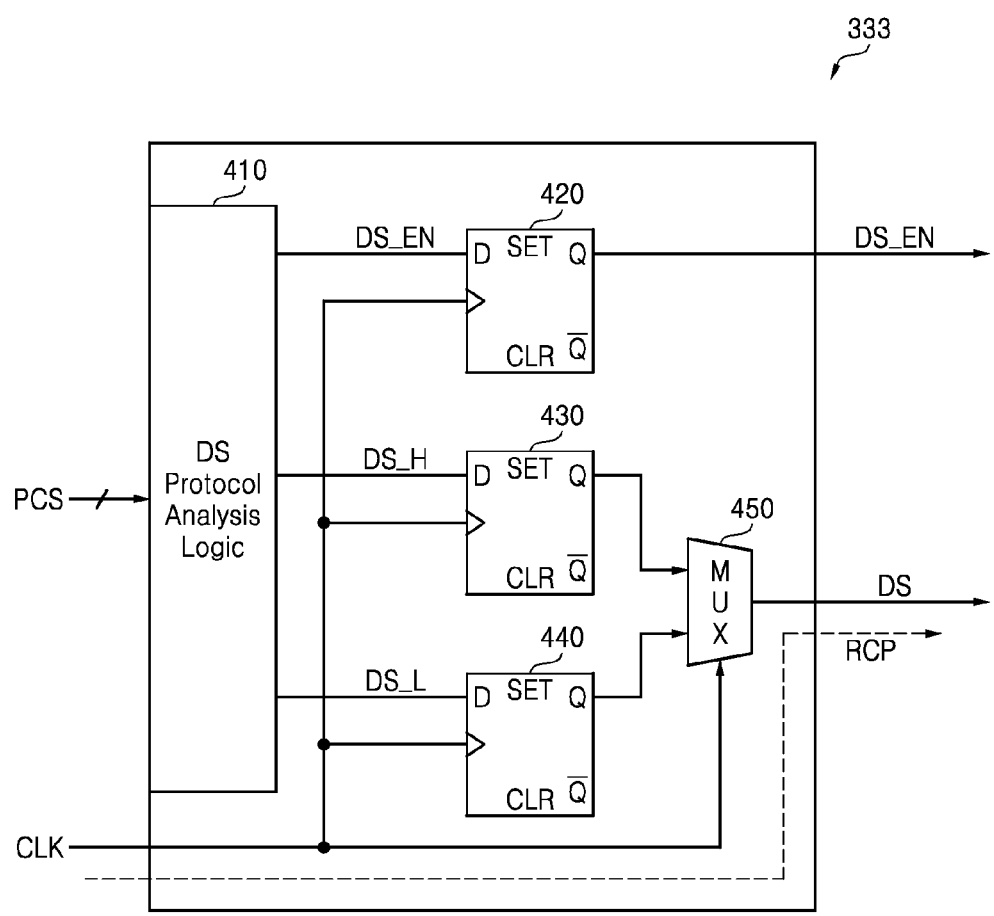
FIG. 6A is a block diagram of a more detailed example of a data strobe control unit shown in FIG. 4, according to an embodiment of the inventive concept.
Figure 6B:
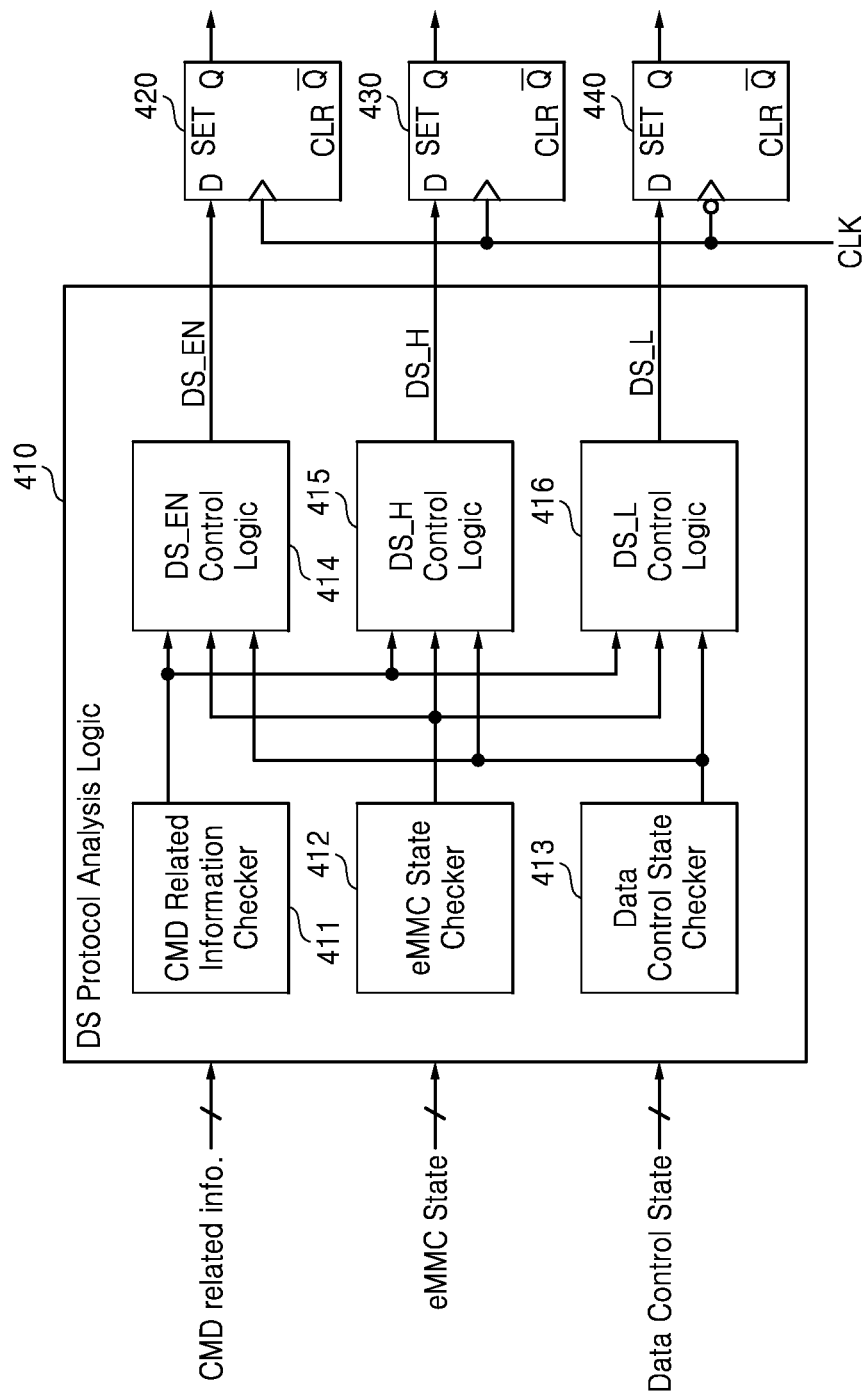
FIG. 6B is a block diagram of protocol analysis logic illustrated in FIG. 6A, according to an embodiment of the inventive concept.

FIG. 6A is a block diagram of the structure of data strobe control unit 333 illustrated in FIG. 4, according to an embodiment of the inventive concept. FIG. 6B is a block diagram of the structure of a protocol analysis logic 410 illustrated in FIG. 6A, according to an embodiment of the inventive concept.

Referring to FIGS. 6A and 6B, data strobe control unit 333 comprises protocol analysis logic 410, latches 420, 430, and 440, and a selection circuit 450. Protocol analysis logic 410 analyzes a protocol control signal PCS and selectively enables data strobe signal DS. Protocol analysis logic 410 generates a data strobe enable signal DS_EN, a first level signal DS_H, and a second level signal DS_L according to protocol control signal PCS. Protocol control signal PCS may be a signal output from host command decoding unit 335, eMMC state control unit 339, and/or data control unit 331. As shown in FIG. 6B, protocol analysis logic 410 comprises a command related information checker 411, an eMMC state checker 412, a data control state checker 413, a data strobe enable signal control logic 414, a first level signal control logic 415, and a second level signal control logic 416.

Command related information checker 411 checks command related information output from host command decoding unit 335 and outputs a signal based on the command related information. The eMMC state checker 412 checks an eMMC state signal output from eMMC state control unit 339 and outputs a signal based on the eMMC state signal. Data control state checker 413 checks a data control state signal output from data control unit 331 and outputs a signal based on the data control state signal.

Data strobe enable signal control logic 414 performs logical operation on the signals respectively output from command related information checker 411, eMMC state checker 412, and data control state checker 413, and it outputs data strobe enable signal DS_EN. First level signal control logic 415 performs a logic operation on the signals respectively output from command related information checker 411, eMMC state checker 412, and data control state checker 413 and outputs first level signal DS_H corresponding to the first half-period signal of data strobe signal DS. Second level signal control logic 416 performs a logic operation on the signals respectively output from command related information checker 411, eMMC state checker 412, and data control state checker 413 and outputs second level signal DS_L corresponding to the second half-period signal of data strobe signal DS.

In an operation using data strobe signal DS, first level signal DS_H is a high-level signal (e.g., VDDQ) and second level signal DS_L is a low-level signal (e.g., VSSQ), but the inventive concept is not limited thereto. For instance, first level signal DS_H and second level signal DS_L may have the same logic level (e.g., high level or low level).

Protocol control signal PCS comprises the command related information, the eMMC state signal, and the data control state signal. The command related information comprises information related with command CMD received from host 200A. It may also include information of the EXT_CSD register, e.g., a mode signal. The mode signal can indicate a type of eMMC 300A defined in a DEVICE_TYPE [196] field of the EXT_CSD register, as shown in FIG. 7.

The eMMC state signal may be a signal indicating the state of eMMC 300A according to the JEDEC standard JESD84-B451. The eMMC state signal may indicate whether eMMC 300A is in a write operation state, a read operation state, or a stand-by state. In the write operation state, eMMC 300A performs a series of operations for receiving write data from host 200A and storing the writ data in flash memory 370. In the read operation state, eMMC 300A performs a series of operations for reading data from flash memory 370 and sending the data to host 200A.

The data control state signal comprises a signal indicating a type of data (e.g., input data or output data) currently controlled by data control unit 331. In other words, the data type signal may indicate a type (e.g., read data, write data, or CRC status response data) of the data that is being processed by eMMC 300A.

First latch 430 latches first level signal DS_H in response to a rising edge of clock signal CLK. Second latch 440 latches second level signal DS_L in response to a falling edge of clock signal CLK. Selection circuit 450 outputs first level signal DS_H latched by first latch 430 as a part of data strobe signal DS in response to a second level (e.g., low level) of clock signal CLK and outputs second level signal DS_L latched by second latch 440 as a part of data strobe signal DS in response to a first level (e.g., high level) of clock signal CLK. Selection circuit 450 may be implemented by a multiplexer. Third latch 420 latches data strobe enable signal DS_EN output from protocol analysis logic 410 in response to clock signal CLK.

The structure of data output path DOP illustrated in FIG. 5 is substantially the same as that of data strobe output path RCP illustrated in FIG. 6A. Accordingly, data DAT[7:0] and data strobe signal DS, which are transmitted to host 200A, are edge-aligned with each other and skew between data DAT[7:0] and data strobe signal DS is eliminated or reduced.

Alternatively, data strobe signal DS may be generated using a circuit different from that illustrated in FIGS. 6A and 6B. For instance, data strobe control unit 333 may generate data strobe signal DS by delaying clock signal CLK by a predetermined time. Data strobe control unit 333 may comprise a delay logic that delays clock signal CLK by the predetermined time. Additionally, the delay or latency of the delay logic may be adjusted or programmed. For instance, where the delay or latency of data output path DOP comprising read latch circuit 331R illustrated in FIG. 5 is designed or adjusted to be the same as that of data strobe output path RCP including data strobe control unit 333 illustrated in FIG. 6A, data strobe control unit 333 outputs through eMMC pads 34 data strobe signal DS synchronized with data DAT[7:0] output through eMMC pads 33.

Data strobe signal DS may be used by host 200A as a strobe signal for a high-speed read operation, which may allow read data to be reliably stored in read latch circuit 240.

FIG. 7 is a table showing possible bit definitions for a device type field of an eMMC, according to an embodiment of the inventive concept.

Referring to FIG. 7, DEVICE_TYPE[196] field of the EXT_CSD register defines a type of eMMC 300A. While only bits 0 through 5 of the DEVICE_TYPE[196] field are defined in the JESD84-B451, information indicating whether eMMC 300A supports the HS400 mode is stored in the DEVICE_TYPE[196] field according to the current embodiments.

For instance, information indicating whether the 200 MHz DDR mode is supported at a voltage of 1.8 V (i.e., VCCQ=1.8 V) is stored in bit 6 and information about whether the 200 MHz DDR mode is supported at a voltage of 1.2 V (i.e., VCCQ=1.2 V) is stored in bit 7.

The DEVICE_TYPER[196] field of the EXT_CSD register is transmitted from eMMC 300A to host 200A according to SEND_EXT_CSD (CMD8) output from host 200A. Accordingly, host 200A can determine whether eMMC 300A supports the HS400 mode based on bit 6 or 7 stored in the DEVICE_TYPE[196] field of the EXT_CSD register.

Figure 8:
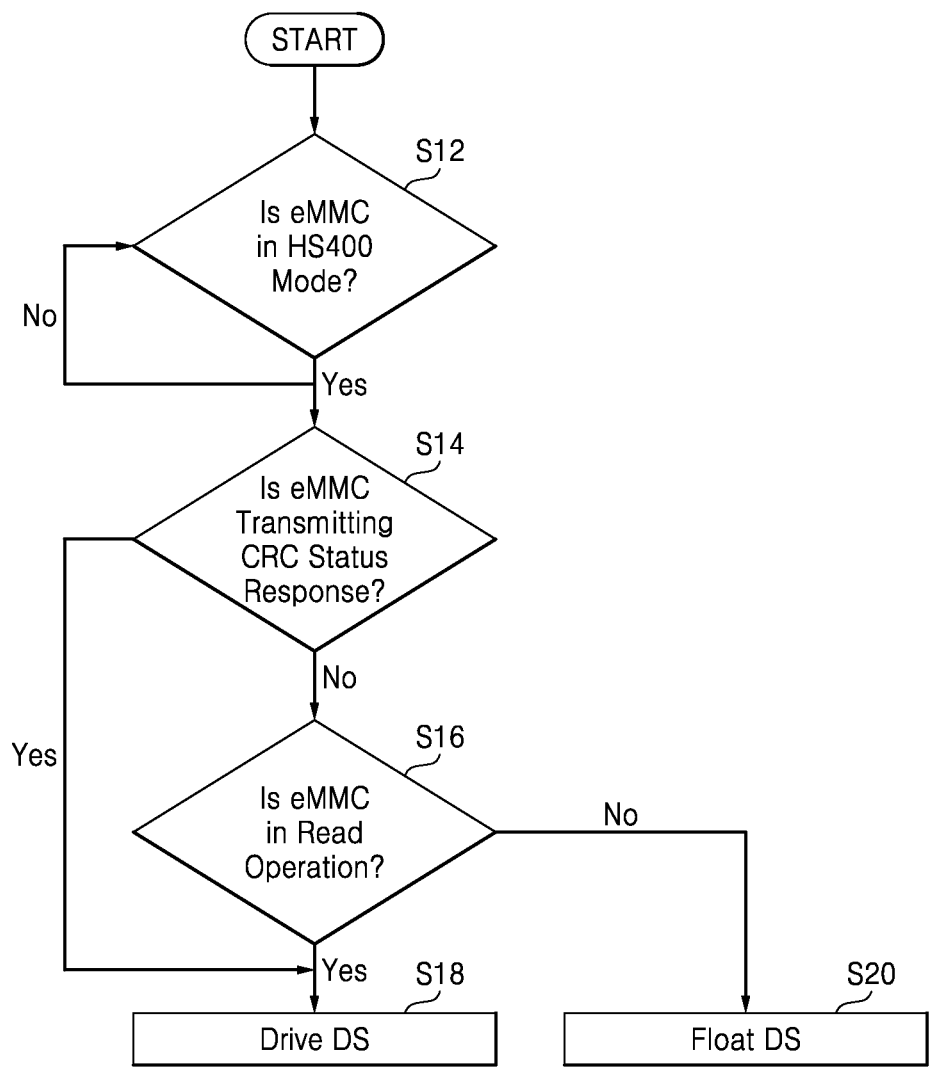
FIG. 8 is a flowchart illustrating a method of operating an eMMC, according to an embodiment of the inventive concept.

FIG. 8 is a flowchart illustrating a method of operating eMMC 300A according to an embodiment of the inventive concept. In the method of FIG. 8, eMMC 300A selectively drives or enables data strobe signal DS according to whether eMMC 300A is in the HS400 mode, whether eMMC 300A is transmitting a CRC status response, and whether eMMC 300A is performing a read operation.

Referring to FIG. 8, protocol analysis logic 410 analyzes protocol control signal PCS to determine whether eMMC 300A is in the DDR 400 mode (S12). If not (S12=No), the method continues to monitor eMMC 300A to determine whether it enters this mode. Otherwise (S12=Yes), the method next determines whether eMMC 300A is transmitting a CRC status response (S14). If so (S14=Yes), the method enables data strobe enable signal DS_EN and drives data strobe signal DS (S18). Otherwise (S14=No), the method determines whether eMMC 300A is performing a read operation (S16). If so (S16=Yes), eMMC 300A enables data strobe enable signal DS_EN and drives data strobe signal DS (S18). Otherwise (S16=No), eMMC 300A disables data strobe enable signal DS_EN and floats data strobe signal DS (S20).

Figure 9A:
FIG. 9A is a timing diagram illustrating operations of an eMMC, according to an embodiment of the inventive concept.
Figure 9B:
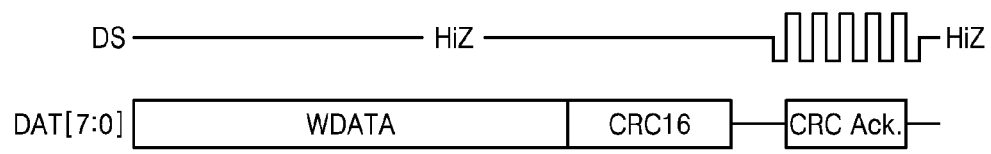
FIG. 9B is a timing diagram illustrating operations of an eMMC, according to an embodiment of the inventive concept.
Figure 9C:
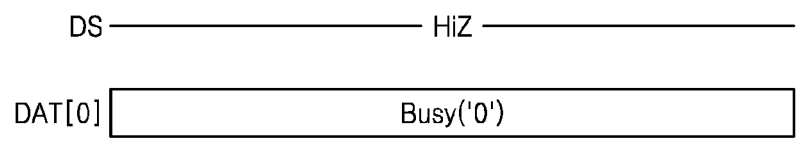
FIG. 9C is a timing diagram illustrating operations of an eMMC, according to an embodiment of the inventive concept.

FIGS. 9A through 9C are timing diagrams illustrating various operations of eMMC 300A according to embodiments of the inventive concept.

Referring to FIG. 9A, data strobe signal DS is driven in the read operation in the HS400 mode. For instance, data strobe signal DS may be enabled while read data RDATA and CRC data CRC16 of read data RDATA are being transmitted to host 200A. In the example of FIG. 9A, data strobe signal DS is driven with a toggling pattern, i.e., it repeatedly switches between respective high and low states.

Referring to FIG. 9B, data strobe signal DS is driven during part of the period of the write operation in the HS400 mode. For instance, where eMMC 300A receives write data WDATA and CRC data CRC16 of write data WDATA from host 200A in the write operation, it transmits a CRC status response CRC Ack. to host 200A. Data strobe signal DS is enabled while the CRC status response CRC Ack. is being transmitted to host 200A. While write data WDATA and CRC data CRC16 are being received from host 200A, data strobe signal DS may not be enabled but may be maintained at a high impedance HiZ or a predetermined DC level.

Referring to FIG. 9C, data strobe signal DS is not enabled where eMMC 300A is busy in the HS400 mode. In a busy state, a particular bus (e.g., DAM) among the data buses is driven to "0". In this period, data strobe signal DS is not enabled but is maintained at high impedance HiZ or a predetermined DC level. Alternatively, in the period while eMMC 300A is busy, data strobe signal DS may be enabled to a high level and both of the first and second level signals DS_H and DS_L may be set to the low or high level.

Figure 11:
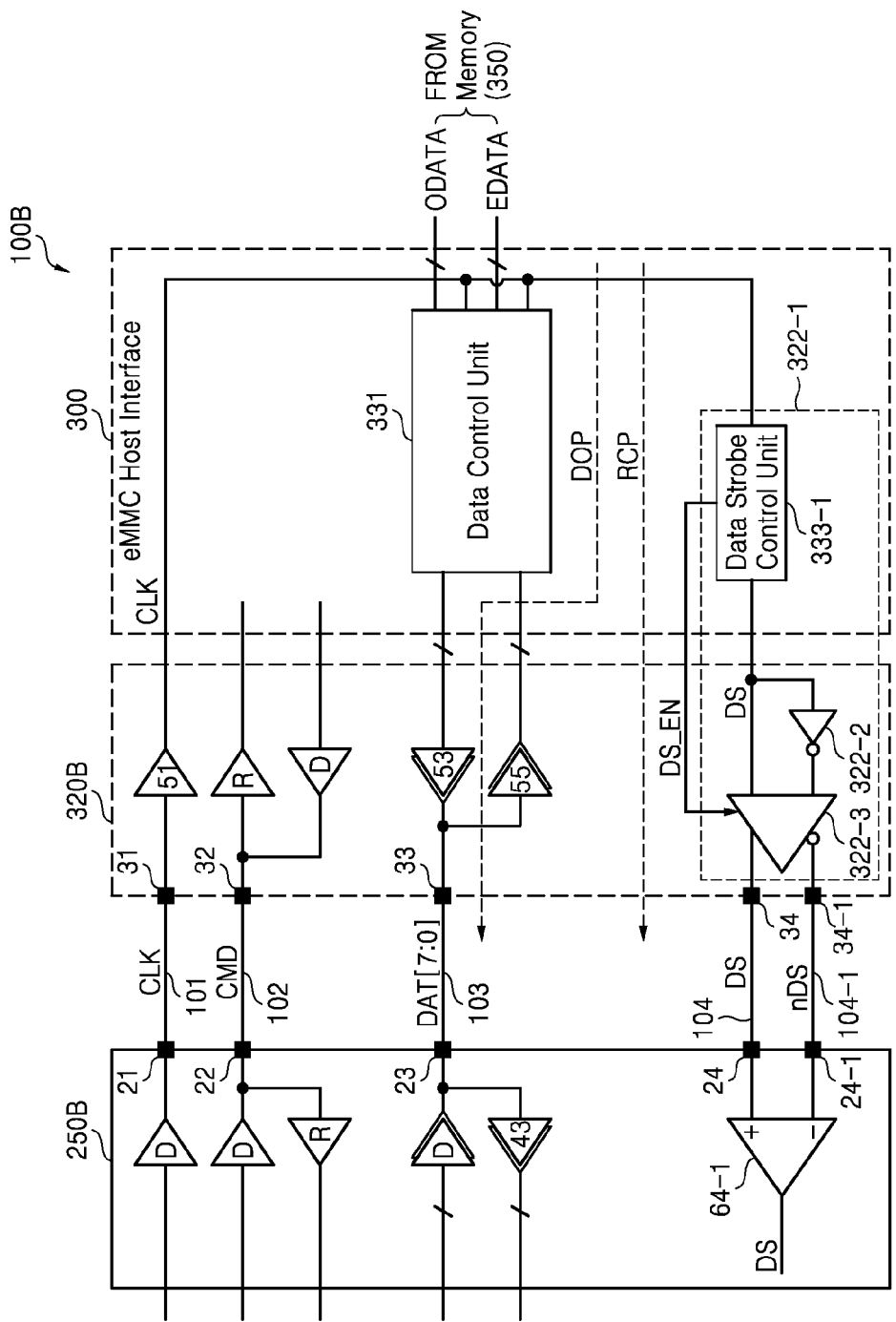
FIG. 11 is a diagram of input/output blocks of the eMMC system illustrated in FIG. 10, according to an embodiment of the inventive concept.

FIG. 10 is a block diagram of an eMMC system 100B according to an embodiment of the inventive concept. FIG. 11 is a diagram of input/output blocks 250B and 320B of eMMC system 100B illustrated in FIG. 10.

Referring to FIG. 10, eMMC system 100B comprises a host 200B and an eMMC, 300B. The structure and the functions of eMMC system 100B illustrated in FIG. 10 are substantially the same as those of eMMC system 100A illustrated in FIG. 1, except for the structure and the functions of host I/O block 250 of a host controller 230B and those of eMMC I/O block 320B of an eMMC controller 310B. Apart from data strobe bus 104, a complementary data strobe bus 104-1 is additionally provided between host I/O block 250B and eMMC I/O block 320B.

The eMMC system 100B illustrated in FIG. 10 has a differential signaling architecture to eliminate or reduce the influence of noise occurring due to data strobe signal DS. In detail, eMMC 300B transmits data strobe signal DS and a complementary data strobe signal nDS to host 200B through data strobe buses 104 and 104-1, respectively. The eMMC I/O block 320B illustrated in FIG. 10 comprises a differential data strobe generator 322-1 for generating differential data strobe signals DS and nDS.

Referring to FIG. 11, differential data strobe generator 322-1 of eMMC controller 310B includes a data strobe control unit 333-1, an inverter 322-2, and a differential amplifier 322-3. Data strobe control unit 333-1 has substantially the same structure and functions as data strobe control unit 333 illustrated in FIG. 6A. Inverter 322-2 inverts data strobe signal DS. Differential amplifier 322-3 generates differential data strobe signals DS and nDS based on data strobe signal DS and an output signal of inverter 322-2.

Differential data strobe signals DS and nDS are transmitted to a differential amplifier 64-1 through components 34, 34-1, 104, 104-1, 24, and 24-1. Differential amplifier 64-1 amplifies a difference between differential data strobe signals DS and nDS and transmits the amplified data strobe signal DS to read latch circuit 243.

Figure 12A:
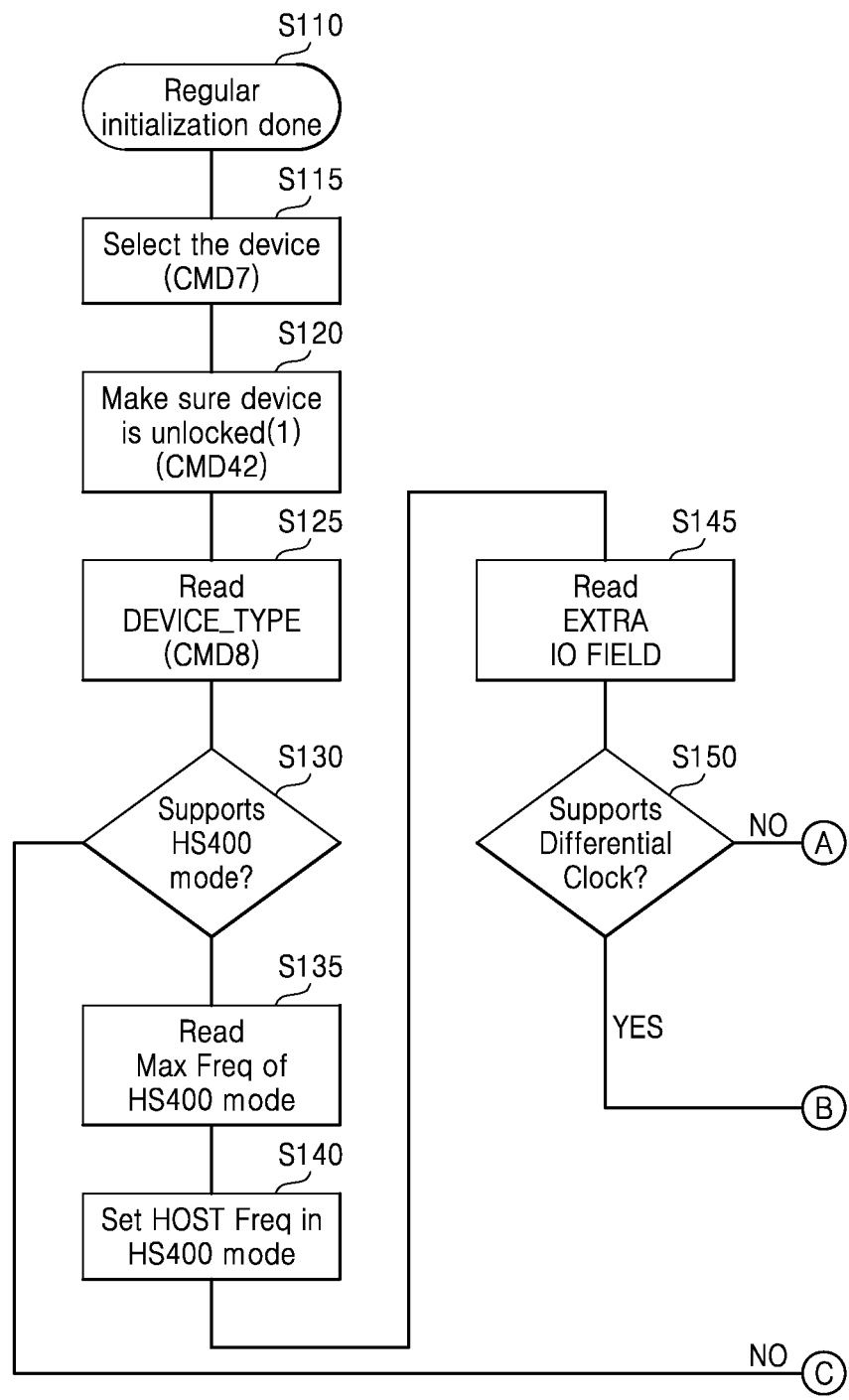
FIG. 12A is a flowchart illustrating operations of the eMMC system illustrated in FIG. 1 or 10, according to an embodiment of the inventive concept.
Figure 12B:
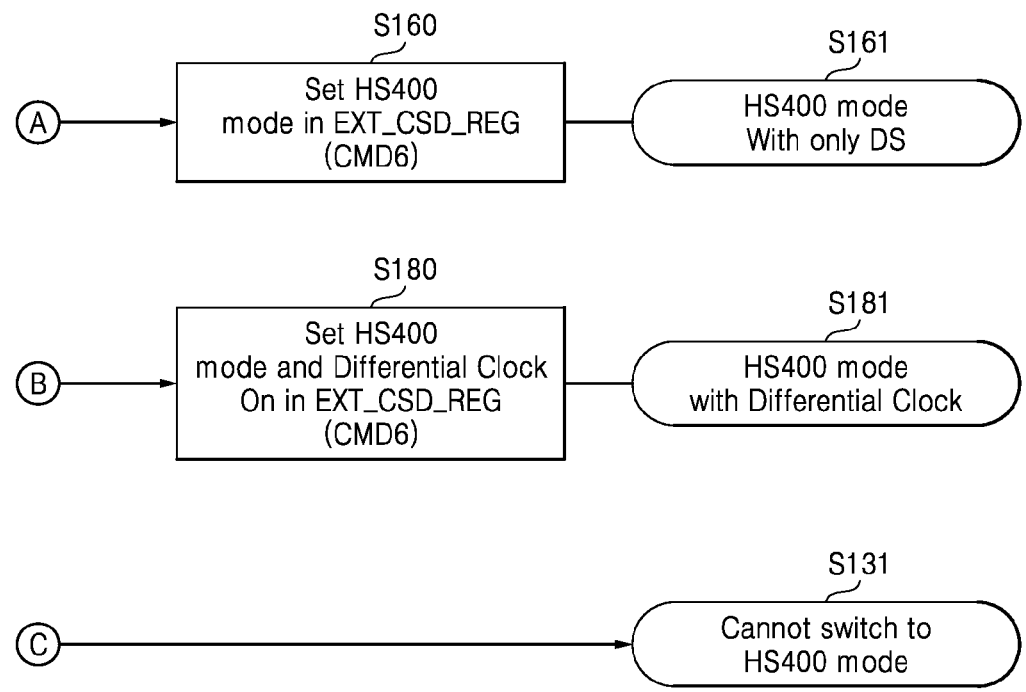
FIG. 12B is a flowchart illustrating operations of the eMMC system illustrated in FIG. 1 or 10, according to an embodiment of the inventive concept.

FIGS. 12A and 12B are flowcharts of the operations of eMMC system 100A or 100B illustrated in FIG. 1 or 10.

Referring to FIGS. 1 through 12B, host 200A or 200B (collectively denoted 200) determines whether regular initialization of eMMC 300A or 300B (collectively denoted 300) has been completed (S110) and selects eMMC device 300 using CMD7 (S115).

Host 200 determines whether eMMC 300 has been unlocked using CMD42 (S120). Operations S110 through S120 of eMMC system 100A or 100B (collectively denoted 100) are described in JESD84-B451. In other words, host 200 initializes eMMC 300 and then reads the DEVICE_TYPE[196] from EXT_CSD register 371 to verify whether eMMC 300 supports the HS400 mode.

Host 200 issues the SEND_EXT_CSD command (CMD8) and reads a value from EXT_CSD register 371 (S125). At this time, host 200 determines whether eMMC 300 supports the HS400 mode using information, e.g., bit 6 or 7, stored in the DEVICE_TYPE[196] of EXT_CSD register 371 illustrated in FIG. 5 (S130).

Where eMMC 300 does not support the HS400 mode (S130=No), eMMC 300 cannot switch to the HS400 mode (S131). However, where eMMC 300 supports the high speed HS400 mode (S130=Yes), host 200 reads the maximum frequency of clock signal CLK in the HS400 mode, which is stored in the VENDOR_SPECIFIC_FIELD of EXT_CSD register 371 (S135).

Host 200 changes or sets a frequency of clock signal CLK using the maximum frequency control signal Fmax generated according to the information about the maximum frequency of clock signal CLK (S140). Thereafter, host 200 reads information from the extra 10 field in the HS400 mode, which is stored in the VENDOR_SPECIFIC_FIELD of EXT_CSD register 371 (S145). Host 200 determines whether eMMC 300 supports differential data strobe signals DS and nDS (S150).

Where eMMC 300 does not supports differential data strobe signals DS and nDS (S150=No), host 200 sets the HS400 mode using the SWITCH command (CMD6) (S160), and performs the HS400 mode that supports only data strobe signal DS (S161). On the other hand, where eMMC 300 supports differential data strobe signals DS and nDS (S150=Yes), host 200 sets the HS400 mode and "complementary data strobe signal on" using the SWITCH command (CMD6) (S180), and performs the high speed HS400 mode that supports data strobe signal DS and the complementary data strobe signal nDS (S181).

The eMMC 300A or 300B floats data strobe signal DS and/or complementary data strobe signal nDS, or it maintains at least one of them at a predetermined level, e.g., the level of the I/O operating voltage VCCQ or ground voltage VSSQ until eMMC 300A or 300B enters the HS400 mode or in a period during which data strobe signal DS or nDS is disabled in the HS400 mode, thereby preventing hosts 200A and 200B and eMMCs 300A and 300B from operating in error.

As described above, according to an embodiment of the inventive concept, an eMMC having a structure using a unidirectional data strobe signal flexibly uses the data strobe signal according to its mode, its state, data type and so on, so that the eMMC is compatible with existing eMMCs.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. An embedded multimedia card (eMMC), comprising:
a clock channel configured to receive a clock signal from a host;
a command channel configured to receive a command from the host;
a plurality of bidirectional data channels configured to transmit read data to the host during a high speed (HS) read operation, and receive write data from the host during a write operation;
a unidirectional data strobe channel configured to transmit a data strobe signal to the host synchronously with the read data during the HS read operation; and
a data strobe control unit configured to generate the data strobe signal from the clock signal during the HS read operation in response to a protocol control signal received from the host via the command channel,
wherein the data strobe control unit is further configured to analyze the protocol control signal, generate a data strobe enable signal in response to the analyzing of the protocol control signal, wherein the data strobe signal is generated with a toggling pattern if the data strobe enable signal is enabled and floats if the data strobe enable signal is disabled, and
wherein the data strobe control unit is further configured to enable the data strobe enable signal when the eMMC transmits a cyclic redundancy check (CRC) status response signal to the host corresponding to write data received from the host during a write operation performed using a double data rate (DDR) 400 mode.

2. The eMMC of claim 1, wherein the data strobe control unit generates the data strobe signal by delaying the clock signal by a predetermined time.

3. The eMMC of claim 1, wherein the protocol control signal comprises at least one of a mode signal, a state signal, and a data type signal.

4. The eMMC of claim 3, wherein the mode signal indicates whether the eMMC is in the double data rate (DDR) 400 mode during the HS read operation, the state signal indicates one of a write operation state, a read operation state, and a stand-by state, and the data type signal indicates at least one of read data, write data, and cyclic redundancy check (CRC) status response data.

5. The eMMC of claim 1, wherein the data strobe control unit is further configured to enable the data strobe enable signal during the HS read operation.

6. The eMMC of claim 1, wherein the data strobe control unit is further configured to disable the data strobe enable signal when the eMMC is in a busy state.

7. The eMMC of claim 1, further comprising a complementary data strobe channel configured to transmit a complementary data strobe signal having a 180-degree phase difference from the data strobe signal to the host.

8. The eMMC of claim 1, wherein the data strobe signal is edge-aligned with the read data transmitted to the host during the HS read operation.

9. An embedded multimedia card (eMMC), comprising:
a clock channel configured to receive a clock signal from a host;
a command channel configured to receive a command from the host;
a plurality of bidirectional data channels configured to transmit read data to the host during a high speed (HS) read operation, and receive write data from the host during a write operation;
a unidirectional data strobe channel configured to transmit a data strobe signal to the host synchronously with the read data during the HS read operation; and
a data strobe control unit configured to generate the data strobe signal from the clock signal during the HS read operation in response to a protocol control signal received from the host via the command channel,
wherein the data strobe control unit is further configured to analyze the protocol control signal, generate a data strobe enable signal in response to the analyzing of the protocol control signal, wherein the data strobe signal is generated with a toggling pattern if the data strobe enable signal is enabled and floats if the data strobe enable signal is disabled,
wherein the data strobe control unit is further configured to disable the data strobe enable signal when the eMMC is in a busy state, and
wherein a selected channel among the plurality of data channels is maintained at a first logic level during the busy state.

10. An embedded multimedia card (eMMC), comprising:
a clock channel configured to receive a clock signal from a host;
a command channel configured to receive a command from the host;
a plurality of data channels configured to transmit data to the host;
a data strobe channel configured to transmit a data strobe signal synchronized with the data to the host; and
a data strobe control unit configured to selectively enable or generate the data strobe signal according to a protocol control signal, wherein the data strobe control unit analyzes the protocol control signal and generates a data strobe enable signal and the data strobe channel transmits the data strobe signal to the host with a toggling pattern where the data strobe enable signal is enabled and floats the data strobe signal when the data strobe enable signal is disabled, and
the data strobe control unit comprises:
a command related information checker configured to check information related with the command received from the host;
an eMMC state checker configured to check a state signal of the eMMC;
a data control state checker configured to check a data control state signal indicating a type of data that is input or output;
a data strobe enable signal control logic configured to perform a logic operation on signals respectively output from the command related information checker, the eMMC state checker, and the data control state checker and to output the data strobe enable signal;
a first level signal control logic configured to perform a logic operation on signals respectively output from the command related information checker, the eMMC state checker, and the data control state checker and to output a first level signal corresponding to a first half-period signal of the data strobe signal; and
a second level signal control logic configured to perform a logic operation on the signals respectively output from the command related information checker, the eMMC state checker, and the data control state checker and to output a second level signal corresponding to a first half-period signal of the data strobe signal.

11. The eMMC of claim 10, wherein the first level signal and the second level signal are high level signals or low level signals.

12. A method of operating an embedded multimedia card (eMMC) system comprising an eMMC and a host, the method comprising:
the eMMC receiving a clock signal from the host via a clock channel;
the eMMC receiving a command via a command channel and decoding the command;
transmitting read data from the eMMC to the host during a read operation in a high speed (HS) mode in response to the command via a plurality of bidirectional data channels;
generating a toggling data strobe signal in the eMMC only during the HS mode and providing the toggling data strobe signal to the host via a unidirectional data strobe channel synchronously with the read data in response to the clock signal and a protocol control signal received from the host via the command channel;
the host latching the read data in a read latch circuit in response to the data strobe signal; and
the host selecting between the clock signal and the data strobe signal using a selection circuit in response to a selection signal provided by a state control unit, wherein the selection signal has a first level while the eMMC system is operating in the HS mode, and transmitting cyclic redundancy check (CRC) status response data from the eMMC to the host.

13. The method of claim 12, wherein the generating of the toggling data strobe signal comprises:
analyzing the protocol control signal and generating a data strobe enable signal;
transmitting the data strobe signal with a toggling pattern to the host when the data strobe enable signal is enabled; and
floating the data strobe signal when the data strobe enable signal is disabled.

14. The method of claim 13, wherein the data strobe enable signal is enabled while the eMMC is transmitting data read from a flash memory to the host in a double data rate (DDR) 400 mode.

15. The method of claim 13, wherein the data strobe enable signal is disabled while the eMMC is in a busy state in a double data rate (DDR) 400 mode.

16. A method of operating an embedded multimedia card (eMMC) system comprising an eMMC and a host, the method comprising:
the eMMC receiving a clock signal from the host via a clock channel;
the eMMC receiving a command via a command channel and decoding the command;
transmitting read data from the eMMC to the host during a read operation in a high speed (HS) mode in response to the command via a plurality of bidirectional data channels; and
generating a toggling data strobe signal in the eMMC only during the HS mode and providing the toggling data strobe signal to the host via a unidirectional data strobe channel synchronously with the read data in response to the clock signal and a protocol control signal received from the host via the command channel,
wherein the generating of the toggling data strobe signal comprises analyzing the protocol control signal and generating a data strobe enable signal, transmitting the data strobe signal with a toggling pattern to the host when the data strobe enable signal is enabled, and floating the data strobe signal when the data strobe enable signal is disabled, and
wherein the data strobe enable signal is enabled while the eMMC is transmitting to the host a cyclic redundancy check (CRC) status response signal, which corresponds to write data received from the host, in a write operation in a double data rate (DDR) 400 mode.

* * * * *